United States Patent [19]

Sakamura et al.

[11] Patent Number: 4,926,321
[45] Date of Patent: May 15, 1990

[54] METHOD OF SEARCHING A QUEUE IN RESPONSE TO A SEARCH INSTRUCTION

[75] Inventors: Ken Sakamura, No. 105, 12-30, Shiroganedai 3-chome, Minato-ku, Tokyo; Kouzi Hashimoto, Mitaka; Ikuya Kawasaki, Kodaira; Atsushi Hasegawa, Koganei; Kazuhiko Iwasaki, Hachiohji, all of Japan

[73] Assignees: Ken Sakamura; Hitachi, Ltd.; Hitachi Microcomputer, Engineering, Ltd., all of Tokyo, Japan

[21] Appl. No.: 89,818

[22] Filed: Aug. 27, 1987

[30] Foreign Application Priority Data

Aug. 27, 1986 [JP] Japan .................................. 61-198869

[51] Int. Cl.$^5$ ........................................... G06F 7/00
[52] U.S. Cl. ........................ 364/200; 364/244.3; 364/259.2; 364/254.5; 364/255.5
[58] Field of Search .................. 364/300, 200, 900

[56] References Cited

U.S. PATENT DOCUMENTS

| | | | |
|---|---|---|---|
| 4,054,945 | 10/1977 | Ichiko et al. | 364/200 |
| 4,245,304 | 1/1981 | Porter et al. | 364/200 |
| 4,384,343 | 5/1983 | Morganti et al. | 364/900 |
| 4,481,608 | 11/1984 | Berkowitz | 364/900 |
| 4,535,420 | 8/1985 | Fung | 364/900 |
| 4,701,847 | 10/1987 | Nichols | 364/200 |

Primary Examiner—Parshotam S. Lall
Assistant Examiner—Christopher L. Makay
Attorney, Agent, or Firm—Antonelli, Terry, Stout Kraus

[57] ABSTRACT

A method for searching the memory of a data processing apparatus including a decoder for decoding the contents of an instruction and an execution unit for executing the instruction based on an output from the decoder is performed in response to a search instruction which identifies a desired data storage area from a plurality of data storage areas in the memory which includes an array data structure.

5 Claims, 6 Drawing Sheets

METHOD OF SEARCHING A QUEUE IN RESPONSE TO A SEARCH INSTRUCTION

BACKGROUND OF THE INVENTION

The present invention relates to the field of data processing, and in particular, to technology which is especially effective when applied to an instruction processor in a system using a program controlled method, for example, to a microprocessor system having an instruction to control access to a memory having an array data structure called a queue.

In a microcomputer system, there has been known a method in which a memory area called an entry having a fixed size is established in a memory and each memory area is linked by use of an index called a pointer, thereby configuring the memory to have an array data structure (queue) by means of software (operating system).

Figure 4:
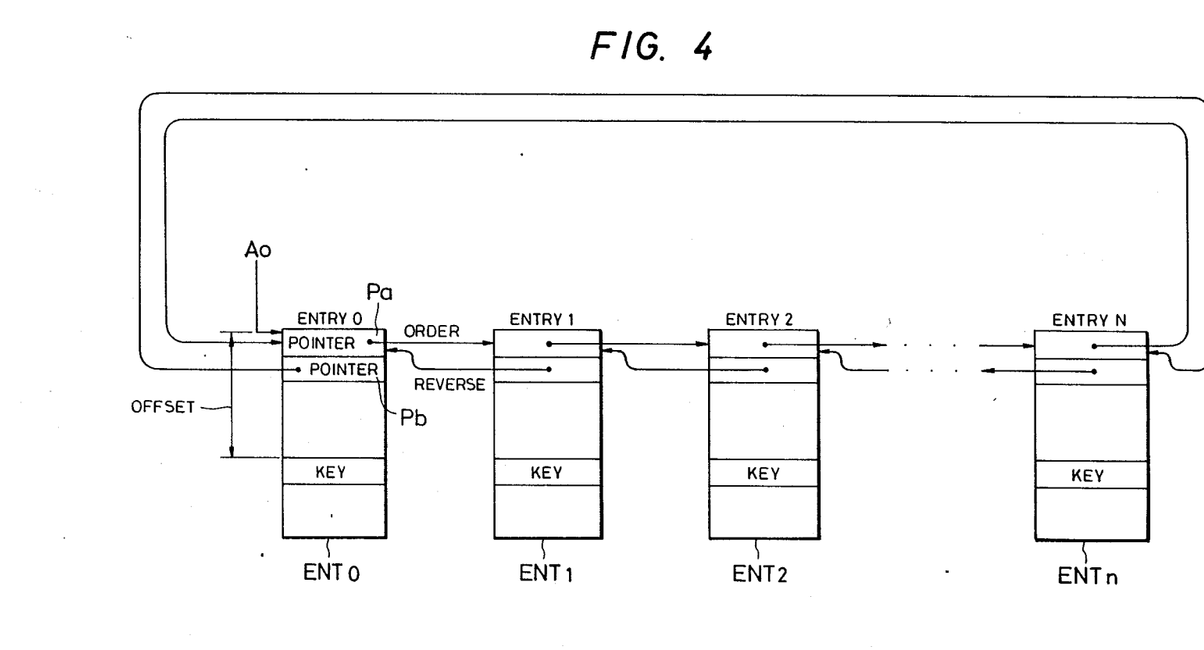
FIG. 4 is a schematic diagram depicting an example of a queue formed in a memory for purposes of explaining the operation of the present invention.

For the general configuration of the queue, reference is made to FIG. 4, in which a plurality of entries $ENT_0$, $ENT_1$, ..., $ENT_n$ are provided in a memory and each entry has a pointer Pa as the first field thereof, in which there is stored an address indicating the first or starting address of an entry following that entry, thereby forming a sequence of data in an array by linking the entries with the pointers. In some cases, there is provided a queue having a double link structure, namely, one in which each entry is provided with a pointer Pb following the pointer field Pa so as to indicate a backward linkage of the entry. The queue configured in this fashion is used in a case where, for example, each entry is used to store jobs (or tasks) requested from a plurality of users and an entry satisfying a predetermined condition is selected from the entries for execution.

Conventionally, for example, in a computer such as the VAX11 of the Digital Equipment Corporation (DEC), there are instructions which serve to insert, to delete, and to replace entries, thereby facilitating the creation of the queue ("DEC VAX11 Architecture Handbook", DEC, 1979, pp. 176–195).

In a computer of the type described above, however, a search for a desired entry from a queue has not been provided. Consequently, in a case where a desired entry is to be retrieved, the search operation must be effected by use of a sequence of data transfer instructions (MOVE instructions).

As a result, a long period of time is required to retrieve an entry of a queue, which leads to a disadvantage that the efficiency of the operating system for effecting the table control in the multitask processing, the multiuser processing, and the like is deteriorated.

SUMMARY OF THE INVENTION

It is therefore an object of the present invention to increase the speed of the queue retrieval operation in a microprocessor system configured to include an instruction system supporting the creation of a queue and thereby to improve the efficiency of the operating system handling multitask, multiuser processing, and the like.

The above and other objects and novel features of the present invention are achieved in a microprocessor configured to have an instruction system supporting the creation of a queue, and in which a new retrieval instruction is added to retrieve a queue. The queue retrieval instruction is effected after data necessary for the queue retrieval, such as the first address of the first entry, a compare value as a condition for the selection, and an offset value of the retrieval data in the entry, are set into predetermined registers. The first address of a desired entry is obtained by the queue retrieval instruction and by a register set instruction preceding the queue retrieval instruction so as to increase the queue retrieval speed, which makes it possible to achieve the object that the efficiency of the operating system handling multitask, multiuser processing, and the like is improved.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1A:
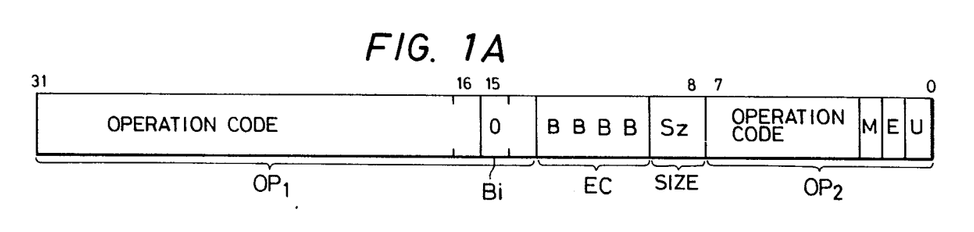
FIGS. 1A–1C are explanatory diagrams illustrating examples of the format of a queue search instruction according to the present invention.

FIG. 1A shows an embodiment of the instruction format of a queue retrieval instruction (to be referred to as a queue search instruction herein) in a case where the present invention is applied to a microprocessor having an instruction processing system in which the instruction is 16 or 32 bits.

The queue search instruction shown in FIG. 1A includes operation designation fields $OP_1$ and $OP_2$, respectively, containing 16 high-order bits and 8 low-order bits each representing operation codes, an end condition designation field EC designating an end condition of the instruction, a size designation field Sz indicating the magnitude of a compare value, a format bit field Bi designating the format of the instruction, an M bit field indicating the presence or absence of a mask of $R_6$, an E bit indicating the end value of the queue, and a U bit designating the direction of the search operation.

Figure 1B:
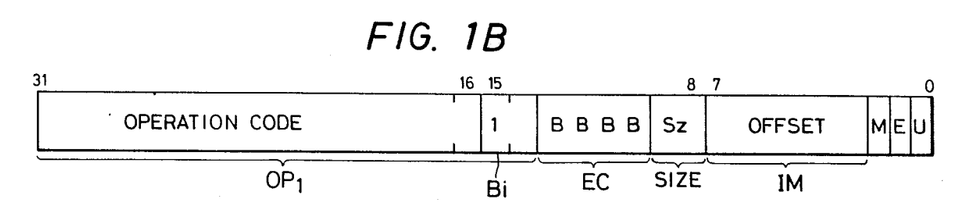

FIG. 1B shows a second format of the queue search instruction according to the present invention. The second instruction format is different from the first instruction format (FIG. 1A) in a point that an immediate addressing is adopted for the offset value. Namely, in the second instruction format, the 5 low-order bits of the 7 bits constituting the operation designation field $OP_2$ in the first instruction formation are replaced with the immediate field IM.

For the queue search instruction, the discrimination between the first format and the second format is effected by use of the bit Bi, for example, if the bit Bi is "0", the 5 low-order bits of the instruction word are treated as the operation designation field $OP_2$; whereas, if the bit Bi is "1", the 5 low-order bits of the instruction word are treated as the immediate field IM. However, since the immediate field IM comprises five bits, the 5-bit code of the immediate field must be converted into 32-bit wide data by use of sign expansion, or In this embodiment, the end condition designation field EC includes four bits, which are defined, for example, as listed in Table 1 as follows.

TABLE 1

| No. | B | B | B | B | END CONDITION CONTENTS |
|---|---|---|---|---|---|
| 1 | 0 | 0 | 0 | 0 | UNCONDITIONAL END |
| 2 | 0 | 0 | 0 | 1 | $= R_3$ |
| 3 | 0 | 0 | 1 | 0 | $\neq R_3$ |
| 4 | 0 | 0 | 1 | 1 | $< R_3$ |
| 5 | 0 | 1 | 0 | 0 | $> R_3$ |
| 6 | 0 | 1 | 0 | 1 | $= R_3$ OR $= R_4$ |
| 7 | 0 | 1 | 1 | 0 | $\neq R_3$ AND $\neq R_4$ |
| 8 | 0 | 1 | 1 | 1 | $< R_3$ OR $> R_4$ |
| 9 | 1 | 0 | 0 | 0 | $> R_3$ AND $< R_4$ |

In this diagram, the conventional symbols $=$, $\neq$, $<$, and $>$ have their well-known meaning. End conditions No. 1 to No. 5 represent the cases where the end conditions are established according to the comparison between the data read from an entry with the value in the register $R_3$, whereas the end conditions No. 6 to No. 9 denote the cases where the end conditions are set depending on the comparison between the value of the register $R_3$ and that of the register $R_.$.

In addition, the size designation field Sz is constituted by two bits and, for example, if the two bits are "00", the compare value includes eight bits; and if the two bits are "01", the compare value includes 16 bits; and if the two bits are "10", the compare value includes 32 bits. Consequently, in a case where the compare value is preliminarily loaded in a register (32 bits) as will be described later, the system operates according to the contents of the size designation field Sz to handle information of the 8, 16, or 32 low-order bits as the effective compare value.

Furthermore, in the embodiment described above, when the M bit is "0", it is indicated that the mask of the register $R_6$ is absent; whereas, when the M bit is "1", the mask is indicated to be present. The E bit denotes the end condition of the queue, namely, for E=0, the end condition is "0"; whereas for E=1, the end condition is indicated by the content of the register $R_2$. The code U of the lower-most bit of the operation designation field $OP_2$ is treated as a code indicating the search direction of the instruction. For example, for U=0, the search is effected in the forward direction; whereas U=1, the search is effected in the backward direction.

Incidentally, in the instruction formats shown in FIGS. 1A and 1B, the arrangement of the respective fields in the 32-bit area does not possess any substantial meaning. However, in a microprocessor in which the read unit of an instruction is selected to be 16 bits, the 32-bit queue search instruction is split into two words so as to be read in an instruction register through two 16-bit read operations.

Figure 1C:
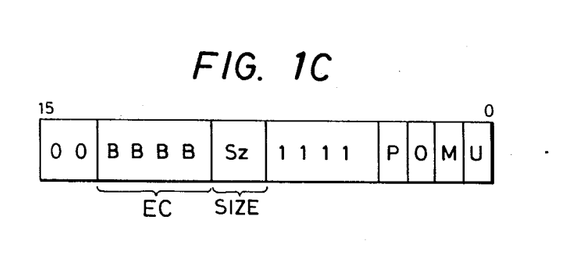

FIG. 1C is a schematic diagram illustrating another form of the queue search instruction according to the present invention. This queue search instruction comprises 16 bits. The operation designation fields $OP_1$, $OP_2$, and $OP_3$ are used to specify that this instruction is a queue search instruction. Furthermore, in addition to the 2-bit size designation field SZ and the 4-bit end condition designation field EC, the instruction format includes the M bit, the U bit, and the like. An offset value necessary for an execution of this instruction is previously set into the register $R_5$, for example. In addition, the P bit designates the size of data to be handled. For example, for P=0, the data size is 32 bits; whereas for P=1, the data size is 64 bits.

Figure 2:
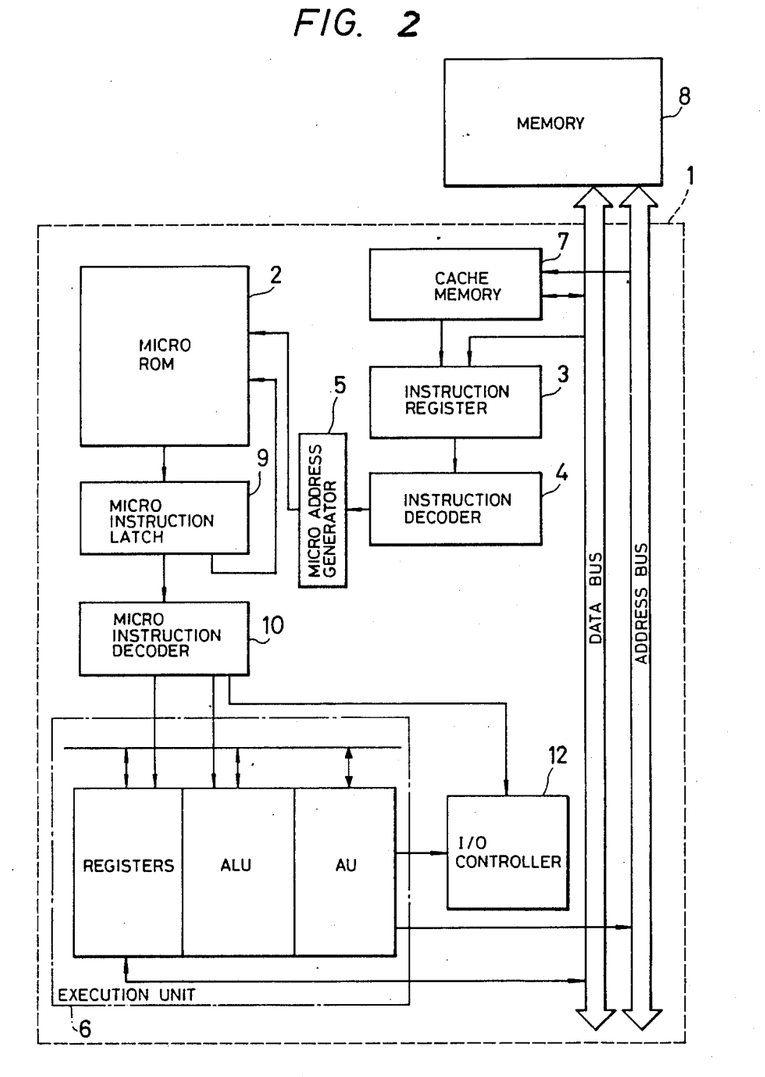
FIG. 2 is a schematic block diagram illustrating an example of a microprocessor for executing the queue search instruction according to the present invention.

FIG. 2 is a schematic block diagram illustrating an example of the hardware configuration of th microprocessor operating by use of an instruction system having the queue search instruction according to the present invention.

The microprocessor of this embodiment includes a control section operating under control of microprograms. That is, in an LSI chip 1 constituting the microprocessor, there is disposed a micro (read only memory) ROM 2, which is accessed by a micro address generator circuit 5 and sequentially outputs micro instructions contained in the microprograms.

The micro address generator circuit 5 is supplied with a signal obtained by decoding in an instruction decoder a code of a macro instruction fetched by an instruction register 3. Based on the supplied signal, the micro address generator circuit 5 forms the corresponding micro address and supplies the address to the micro ROM 2, which is used to read the first micro instruction of a series of micro instruction groups executing the macro instruction. Based on the micro instruction code, the system generates control signals for components, such as an execution unit 6 having various temporary registers, data buffers, an arithmetic logic unit (ALU), an address calculation unit (AU), and the like.

The read operations of the second and subsequent micro instructions in the sequence of micro instruction groups corresponding to the macro instruction are effected by supplying the micro ROM 2 with the code of the next address field of the micro instruction are effected by supplying the micro ROM 2 with the code of the next address field of the micro instruction previously read. That is, there is provided a micro instruction latch 9 for keeping the next address in the previous micro instruction, and the read operations of the second and subsequent micro instructions are achieved based on an output from the micro instruction latch 9 and an address from the micro address generator circuit 5. A sequence of micro instructions thus read is decoded by a micro instruction decoder 10, which outputs a control signal to control the execution unit 6, thereby executing the macro instruction. The address calculation unit (AU) calculates an address of the memory based on information, such as an offset value.

In this embodiment, the buffer store method is adopted; namely, a cache memory 7 is disposed in the microprocessor LSI so as to register to the cache memory 7 the program data to be frequently used among the data stored in an external memory 9. This enables to increase the speed to fetch a program. However, the provision of a cache memory is not essential to the present invention.

Figure 3:
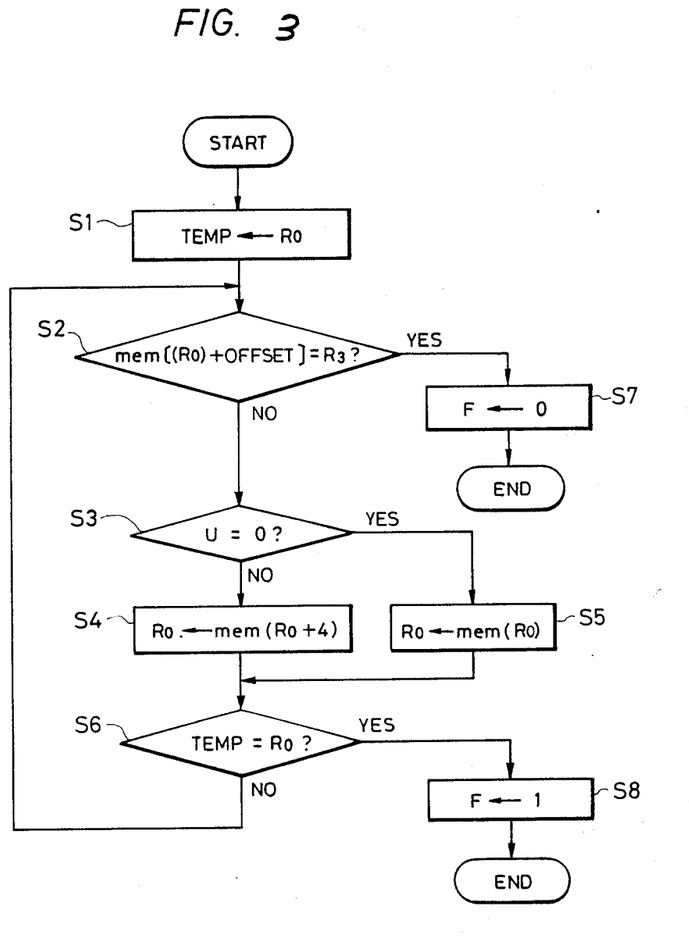
FIG. 3 is a flowchart depicting an example of a processing procedure in a case where the queue search instruction is executed by means of a microprogram.

Next, in FIG. 3, there is shown a processing flowchart of a microprogram in a microprocessor to decode and to execute the queue search instruction. In the microprocessor of this embodiment, however, it is assumed that the first address of the search start entry, the compare value, and the offset value (unnecessary in the second instruction format) required for the queue search are preliminarily loaded in predetermined general-purpose registers, for example registers $R_1$, $R_3$, and $R_5$, respectively, for an execution of the queue search instruction.

Furthermore, the status register in the microprocessor is provided with a flag (to be referred to as an F flag herein) indicating whether or not the search has been completed. If the F flag is "0", the search is indicated to have been successfully completed; whereas if the F flag is "1", the entry to be retrieved is indicated to be missing.

Referring now to the flowchart of FIG. 3, a description will be given of an execution procedure of the queue search instruction. First, in step S1, the first address of the starting entry in the register $R_0$ is copied into a temporary register TEMP (which cannot be accessed by the user). Next, in step S2, the memory is accessed by use of an address obtained by adding the offset value in the register R°, or the immediate field of the instruction, to the address in the register R° so as to read data, which data is then compared with the search data (compare value) in the register $R_3$, thereby judging whether or not the specified condition (Table 1) is satisfied. In this example, the end condition BBBB is indicated to be 0001. That is, assuming the entry $ENT_0$ to be the search start entry in FIG. 4, an access is made at a position of an address obtained by adding the offset value OF to the first address A of the entry $ENT_0$ to read a data Key stored therein and a judgement is effected to determine whether or not the data Key corresponds to the search data in the register $R_3$.

If the step of S2 results in a Yes (equal to) result, control is passed to step S7 to clear the F flag to 0, thereby terminating the instruction. That is, the fact that the data Key read in the step S2 corresponds to the search data (compare value) indicates that the address in the register R° is the first address of the entry to be obtained and hence the retrieval can be terminated with the address retained in the register R°. I the example of FIG. 4, the instruction execution is terminated with the address $A_0$ stored in the register $R_0$.

When the step S2 results in a No (not equal to) result, the program proceeds to step S3, where it is determined whether the code of the bit U is equal to "0" or not. If the bit U is "1", step S4 is effected to access memory at an address obtained by adding "4" to the address in the register $R_0$ so as to obtain data and to store the obtained data in the register $R_0$. In a case where the data width is 32 bits and the address can be specified in word units, the position obtained by adding "4" to the entry start address in the register $R_0$ indicates the pointer Pb in which the first address of the next entry is stored in a search in the backward direction in FIG. 4. Consequently, this makes it possible to effect a backward search of the queue.

On the other hand, when the bit U is "0", control is passed to step S5 and the address contained in the register R° is used to access the memory so as to store data in the register $R_0$. That is, in FIG. 4, the first address of the next entry indicated by the forward-directional pointer Pa of the entry for which the search has just finished is stored in the register $R_0$.

Thereafter, the program proceeds to step S6 to compare the value in the register $R_0$ at this point with the value in the temporary register TEMP into which the value of $R_0$ has been loaded in the step S1, thereby determining whether or not these values correspond to each other. If the values do not match each other, control returns to the step S2 to repeat the procedure described above; otherwise, control is passed to step S8 to set the F flag to "1", thereby terminating the processing. That is, the fact that the values of these registers correspond to each other in the step of S6 means that the position of the entry to be retrieved in FIG. 4 has returned to the entry from which the search was started, namely, an objective entry has not been found by the search operation through the queue. The processing thus terminates the operation by indicating that the search is unsuccessful.

When the queue search instruction is executed and the F flag is cleared to "0" at the termination of the operation as described above, the address stored in the register $R_0$ at the point is the first address of the objective entry; thereafter, by reading data in the associated entry based on the address in the register $R_0$, the multitask processing, multiuser processing, and the like can be smoothly effected.

As described above, in this embodiment, the queue search can be executed by use of an instruction on the assumption that the registers $R_0$, $R_3$, and $R_5$ contain the first address of the search start entry, the compare value, and the offset value, respectively. Consequently, compared to a method in which the search is effected by use of, for example, a MOVE instruction, when the queue search instruction is not provided, the efficiency of the operating system of this method is considerably improved. Furthermore, the period of time required to retrieve the entry is minimized.

Incidentally, in addition to the queue search instruction, the microprocessor used in the embodiment described above is also provided with instructions to insert, to delete, and to replace entries.

Figure 5A:
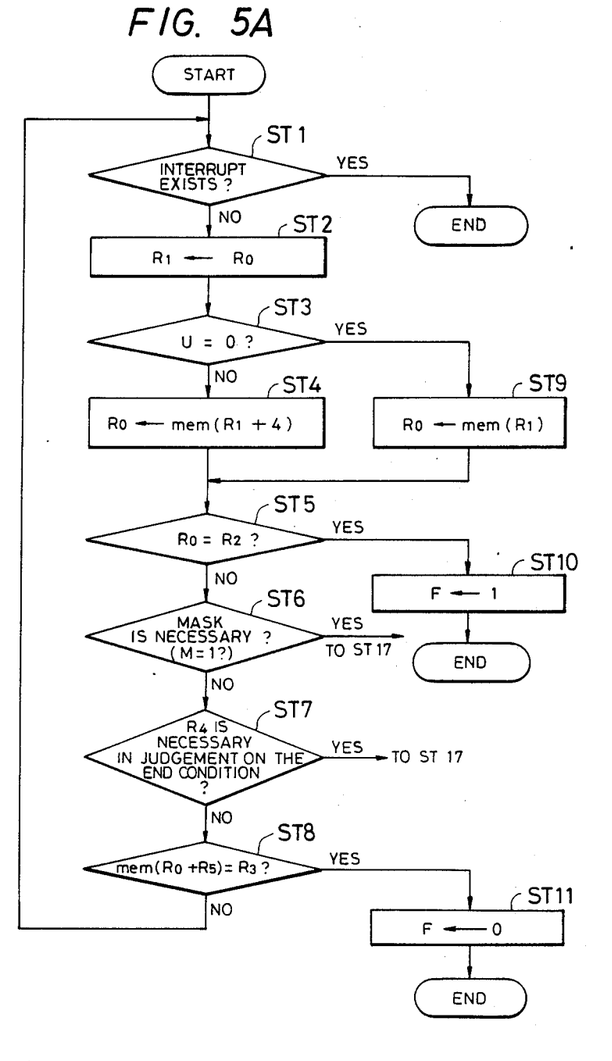
FIGS. 5A–5C are flowcharts showing another example of a processing procedure in a case where the queue search instruction is executed by means of a microprogram.
Figures 5B, 5C:
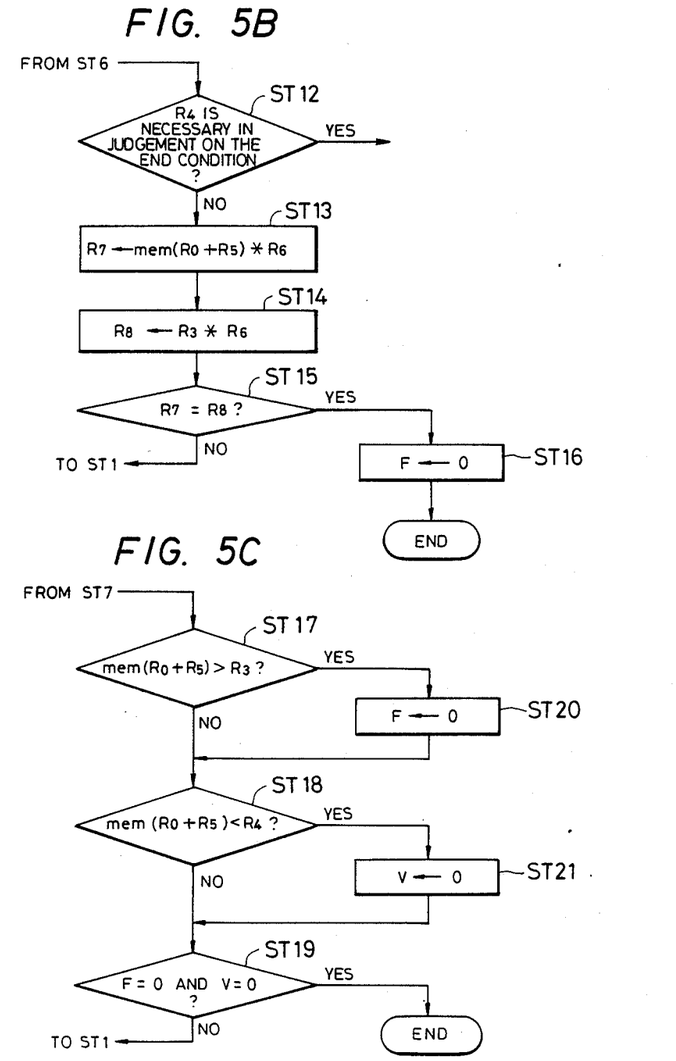

FIGS. 5A-5C are flowcharts of another embodiment according to the queue search instruction of the present invention. When the instruction is to be executed, information necessary for the queue search is previously written in predetermined registers in the microprocessor. That is, the registers $R_2$, $R_3$, $R_4$, $R_5$, and $R_6$ are loaded with the first address of the search end entry, the first oompare value, the second compare value, the offset value, and data for the mask, respectively. The data for the mask is data used to assign data to predetermined bits among a plurality of bits constituting a data item. Furthermore, in this embodiment, two registers $R_0$ and $R_1$ are disposed to store the first addresses of entries. Namely, the first address of the entry being searched for is set into the register $R_0$; whereas the first address of the entry immediately preceding the entry being searched for is set into the register $R_1$. With the provision of the register $R_1$ in addition to the register $R_0$, the flexibility for recognizing the first address of the entry under the search is increased in the microprocessor. Moreover, the status register in the microprocessor is provided with a flag F and a flag V. The flag F is used to indicate the result of the search using the first compare value in the register R:, whereas the flag V is disposed to indicate the result of the search using the second compare value in the register R.. Consequently, when the second compare value is not used in judging the result of the search, information provided by the flag V does not have any particular meaning. Incidentally, when flag F or V is 0, it is indicated that the search condition is satisfied; whereas, when flag F or V is 1, the search condition is indicated not to have been satisfied. An example of the search condition has already been listed in Table 1.

Referring now to the flowchart of FIG. 5A, the execution procedure of the queue search instruction will be described. First, in step SI, it is judged whether or not an interrupt request exists. If this is the case, the interrupt request takes precedence and therefore the queue search instruction is terminated; otherwise, control is passed to step ST2. In the step ST2, the content of the register $R_0$ is set to the register $R_1$, which updates the content of the register $R_1$. In the step ST3, it is judged whether or not the U bit is 0. For U=0, it is indicated that the forward-directional search is to be effected and hence the program proceeds to step ST9, where the memory is accessed to obtain data by use of an address in the register $R_1$ and the data is loaded in the register $R_0$. For U=1, it is indicated that the backward-directional search is to be effected and hence the program proceeds to step ST4, where the memory is accessed to obtain data by use of an address obtained by adding 4 to the address in the register $R_1$ and the obtained data is loaded in register $R_0$.

The ST4 or ST9 sets the first address of the entry to be retrieved to the register $R_0$. Next, in step ST5, it is judged whether or not the content of the register $R_0$ matches that of the register $R_2$. If the contents match each other, it is indicated that the entry to be retrieved reaches the position of the search end entry; consequently, the flag F is set to "1" (step ST10) and the search instruction is terminated. If the contents do not match each other, control is passed to the step ST6, where it is judged whether or not the mask is necessary for the data to be used for the retrieval. A condition of M=1 indicates that the mask is necessary and the program proceeds to step ST12 shown in FIG. 5B. The processing flowchart of FIG. 5B will be described later. A condition of M=0 indicates that the mask is unnecessary and control is passed to step ST7, where it is determined whether or not the content of the register R. is necessary in judging the search end condition. If the content is necessary, the program proceeds to step ST17 of FIG. 5C. The processing flowchart of FIG. 5C will be described later. If the register $R_4$ is unnecessary, control is transferred to step ST8, where the memory is accessed to obtain data by use of an address calculated by adding the offset value in the register R° to the address in the register $R_0$ and the data is compared with the compare value in the register $R_3$, thereby judging whether or not the specified condition (Table 1) is satisfied. In this example, the end condition BBBB is indicated to be 0001. That is, in FIG. 4, assuming the entry ENT° to be the search start entry, the memory is accessed by use of an address obtained by adding the offset value OF to the first address A of the entry ENT° so as to read data Key at the resultant address, and then it is judged whether or not the data Key matches the search data in the register $R_3$. If the step ST8 results in a Yes (equal to) result, control is passed to step ST11 and the flag F is cleared to "0", thereby terminating the instruction. Namely, the fact that the data Key read in the step ST8 matches the search data (compare value) means that the address in the register $R_0$ at that point is the first address of the objective entry; consequently, the search can be terminated with the address retained in the register $R_0$. In the example of FIG. 4, the processing is terminated with the address $A_0$ retained in the register $R_0$. If the step ST8 results in a No (not equal to) result, control returns to the step STI.

Next, the processing flow of FIG. 5C will be described. The processing flow of FIG. 5C is required when the step ST7 of FIG. 5A results in a Yes result in the judgement. In the example of FIG. 5C, the end condition BBBB is indicated to be 1000. In the step ST17, the memory is accessed to attain data by use of an address calculated by adding the offset value in the register R: to the address in the register $R_0$, and then the data is compared with the first compare value in the register $R_3$ for the judgement. When the data is greater than the first compare value, one of the end conditions is satisfied; consequently, the flag F is set to "0" (step ST20) and then control is passed to step ST18. If the data is equal to or less than the first compare value, the end condition is not satisfied; consequently, the program proceeds to step ST18 with the flag F retained at the initial value, "1".

In the step of ST18, the data is compared with the second compare value in the register R. for judgement. When the data is less than the second compare value, one of the end conditions is satisfied; consequently, the flag V is set to "0" (step ST21) and then control is passed to step ST19. If the data is equal to or greater than the second compare value the end condition is not satisfied; as a consequence, the program proceeds to step ST19 with the flag F retained at the initial value "1". In the step ST19, it is judged whether or not both of the flags F and V are "0". If F=0 and V=0, all end conditions are satisfied and hence the instruction processing is terminated. If only F=0 or V=0, the end conditions are not satisfied, and hence control returns to the step ST1.

Next, the processing flow of FIG. 5B will be described. The processing flow of FIG. 5B is required when the step ST6 of FIG. 5A results in a Yes result. In the step ST12, like the step ST7 of FIG. 5A, it is judged whether or not the content of the register $R_4$ is necessary in judging the search end condition. In a case where the content of the register $R_4$ us necessary, the flow is basically the same as that of FIG. 5C; consequently, description thereof will be omitted. If the content of the register $R_4$ is not required, control is passed to step of ST13, where the memory accessed to attain data by use of an address calculated by adding the offset value in the register $R_5$ to the address in the register $R_0$ and the data is masked with the content of the register $R_6$. More specifically, the data and the content of the register $R_6$ are ANDed and the result is set into the register $R_7$. The step ST14, the compare value in the register $R_3$ and the content of the register $R_6$ are ANDed and the result is set into the register $R_8$. In the step ST15, the content of the register $R_7$ is compared with the content of the register $R_8$ to judge whether or not the specified conditions (Table 1) are satisfied. In this example, the end condition BBBB is indicated to be 0001. If the step ST15 results in a Yes result in the judgement, control is passed to the step ST16, where the flag F is cleared to "0", thereby terminating the instruction. If the step ST15 results in a No result, control returns to the step ST1.

As described above, according to the present invention, in a microprocessor configured to include an instruction system supporting the creation of a queue, a new instruction to search a queue is added and the queue search instruction is executed after the first address of the search start entry, the compare value as the selection condition, and the offset value of the search data in an entry each necessary for the queue search, are preliminarily loaded in predetermined registers; consequently, the first address of the desired entry can be attained by a queue search instruction and a register setting instruction preceding the queue search instruction, which increases the speed of the queue search and which makes it possible to obtain a substantial improvement in the efficiency of the operating system handling the multitask processing, the multiuser processing, and the like.

While the present invention has been described with reference to the exemplary embodiments, it is not restricted to those embodiments, and it is to be appreciated that the embodiments can be changed or modified in various fashions without departing from the scope and spirit of the invention. For example, in the embodiments, although the queue search is executed with an instruction on assumption that the registers $R_0$, $R_3$, and $R_5$ are preliminarily loaded with the first address of the search start entry, the compare value, and the offset value, respectively, the data items such as the first address need not be set into the registers by use of instructions, namely, the data items may be supplied as operands of the queue search instruction.

A description has been given of a case where the present invention is applied to an instruction format of a microprocessor, which is a utilization field as the background of the invention; however, the present invention is not restricted by such case, but also can be used in an instruction format in the data processing system of a general purpose computer, a minicomputer, or the like utilizing a program control system.

The effect obtained by the representative features of the present invention disclosed in this specification will be briefly described. That is, the queue retrieval speed is increased, and so the efficiency of the operating system handling the multitask processing, the multiuser processing, and the like can be improved.

While the present invention has been described with reference to the particular illustrative embodiments, it is not restricted by those embodiments but only by the appended claims. It is appreciated that those skilled in the art can change and modify the embodiments without departing from the scope and spirit of the invention.

What is claimed is:

1. A method of searching a memory of a data processing apparatus, said memory having an array data structure formed by a plurality of entries which are searched in response to execution of a search instruction having a predetermined field for holding a predetermined end condition indicating a predetermined relationship, each entry having plural fields for storage of information with one field of each entry storing an address of one field of another entry to link said entries in a predetermined sequence and another field of each entry having a designated offset from said one field and having stored therein a predetermined key, comprising the steps of:
    performing a search operation indicated by said search instruction including the steps of
    (a) storing the address of said one field of a selected entry in a first register,
    (b) copying the address stored in said first register into a second register,
    (c) adding said designated offset to the address stored in said first register to produce an offset address and reading out the predetermined key stored in said another field of said selected entry indicated by said offset address,
    (d) comparing said predetermined key read out of said selected entry to a predetermined condition value to determine if a relationship therebetween satisfies said predetermined relationship indicated by said predetermined end condition,
    (e) indicating completion of said search operation if the comparing in step (d) indicates that said predetermined end condition is satisfied,
    (f) replacing the address stored in said first register by the address of said one field of said selected entry if the comparing in step (d) indicates that said predetermined end condition is not satisfied,
    (g) comparing the address stored in said first register and the address stored in said second register, and
    (h) repeating steps (c) through (g) until occurrence of one of said predetermined end condition being found to be satisfied in step (e) and the address stored in said first register and the address stored in said second register being found to be equal in step (g).

2. A method according to claim 1, further including the steps of:
    (i) indicating that the search operation has been unsuccessful, if the address stored in said first register and the address stored in said second register are found to be equal in step (g).

3. A method according to claim 1, wherein said designated offset is obtained from a third register.

4. A method according to claim 1, wherein said designated offset is obtained from said search instruction.

5. A method according to claim 1, wherein said predetermined end condition is determined by decoding said search instruction.

* * * * *